(12) United States Patent
Felip Leon et al.

(10) Patent No.: US 12,409,555 B2
(45) Date of Patent: Sep. 9, 2025

(54) LOCALIZATION SYSTEM AND METHOD

(71) Applicant: Intel Corporation, Santa Clara, CA (US)

(72) Inventors: Javier Felip Leon, Hillsboro, OR (US); Julio Cesar Zamora Esquivel, West Sacramento, CA (US); David Israel Gonzalez Aguirre, Portland, OR (US); Leobardo Emmanuel Campos Macias, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 751 days.

(21) Appl. No.: 17/555,552

(22) Filed: Dec. 20, 2021

(65) Prior Publication Data
US 2022/0111526 A1  Apr. 14, 2022

(51) Int. Cl.
  *B25J 9/16*  (2006.01)
  *B25J 13/08*  (2006.01)
  *B25J 19/02*  (2006.01)
(52) U.S. Cl.
  CPC .......... *B25J 9/1676* (2013.01); *B25J 9/1607* (2013.01); *B25J 9/161* (2013.01); *B25J 13/089* (2013.01); *B25J 19/02* (2013.01)
(58) Field of Classification Search
  CPC ........ B25J 9/1676; B25J 9/1607; B25J 9/161; B25J 13/089; B25J 19/02; B25J 9/1694; B25J 19/06; G01S 5/30; G01S 5/22; G05B 2219/37351; G05B 2219/40202
  See application file for complete search history.

(56) References Cited

U.S. PATENT DOCUMENTS

| | | | |
|---|---|---|---|
| 11,860,288 B2 * | 1/2024 | Cordourier Maruri | G06N 3/08 |
| 2016/0209390 A1 * | 7/2016 | Overcast | G01N 33/227 |
| 2020/0326401 A1 * | 10/2020 | Cordourier Maruri | G06N 3/08 |
| 2021/0048821 A1 * | 2/2021 | Bondurant | G05D 1/027 |
| 2022/0111526 A1 * | 4/2022 | Felip Leon | B25J 9/1694 |

(Continued)

FOREIGN PATENT DOCUMENTS

| | | | | |
|---|---|---|---|---|
| CN | 104535965 A * | 4/2015 | | G01S 5/22 |
| CN | 111239687 A * | 6/2020 | | G01S 5/22 |

(Continued)

OTHER PUBLICATIONS

Yu, Yang et al., "Deep Learning-Based Vibration Signal Personnel Positioning System", IEEE Access vol. 8, Dec. 14, 2020, pp. 226108-226118.

(Continued)

*Primary Examiner* — Daniel Pihulic
(74) *Attorney, Agent, or Firm* — Viering, Jentschura & Partner mbB

(57) ABSTRACT

A localization system includes a first sensor, configured to detect a vibration and generate a first electrical signal in response to the detection of the vibration; a second sensor, configured to detect a vibration and generate a second electrical signal in response to the detection of the vibration; a third sensor, configured to detect a vibration and generate a third electrical signal in response to the detection of the vibration; and a processor, configured to determine a position of a source of the vibration based on the first electrical signal, the second electrical signal, and the third electrical signal.

21 Claims, 9 Drawing Sheets

(56) References Cited

U.S. PATENT DOCUMENTS

2025/0007600 A1* 1/2025 Choi .................... H04B 7/0617
2025/0008293 A1* 1/2025 Cordourier Maruri ... H04S 7/40

FOREIGN PATENT DOCUMENTS

| CN | 111239687 B | * | 12/2021 | ............... G01S 5/22 |
| CN | 117930137 A | * | 4/2024 | |
| CN | 118625063 A | * | 9/2024 | |
| EP | 4198550 A2 | * | 6/2023 | ............ B25J 13/089 |
| WO | WO-2020126854 A1 | * | 6/2020 | ............. G01S 3/808 |

OTHER PUBLICATIONS

Partial Search Report (pESR) issued for the corresponding European patent application No. EP22201064, dated Apr. 28, 2023, 16 pages (for informational purposes only).

Mostafa M., et al., "Characterizing Wave propagation to improve indoor Step-Level Person Localization using Floor vibration", 11 pages.

* cited by examiner

LOCALIZATION SYSTEM AND METHOD

TECHNICAL FIELD

Various aspects of this disclosure generally relate to the use of sensors for localization of humans.

BACKGROUND

Humans and robots commonly share workspaces. Such robots may be subject to various safety requirements, which may be designed to ensure human safety when within a vicinity of a robot. Conventionally, a physical cage may be used to satisfy such safety requirements. When using such a cage, the cage is configured to divide robot workspace from human workspace. Such cages may be equipped with doors that allow human entry into the robot workspace (e.g. such as for maintenance, transfer of supplies, etc.). The robot may be configured to stop operation immediately upon the cage door opening. Often, the human must implement a "resume execution protocol" before the robot can resume its work.

In some installations, the conventional cage has been replaced with a laser curtain, which may be configured to slow or stop robot action once a human interrupts a beam within the laser curtain. In other installations, a visual device, such as a Light Detection and Ranging (LIDAR) device and/or cameras are used to detect and localize humans relative (e.g. relative to a robot, relative to a danger zone, etc.). These strategies (e.g. laser curtain, LIDAR, camera, etc.) may be expensive compared to a cage. Moreover, these strategies may be unsuitable in certain work environments, such as dusty environments (e.g. from a sanding robot), foggy environments (e.g. from a water jet), etc., in which visibility may be limited.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which.

DESCRIPTION

Figure 1:
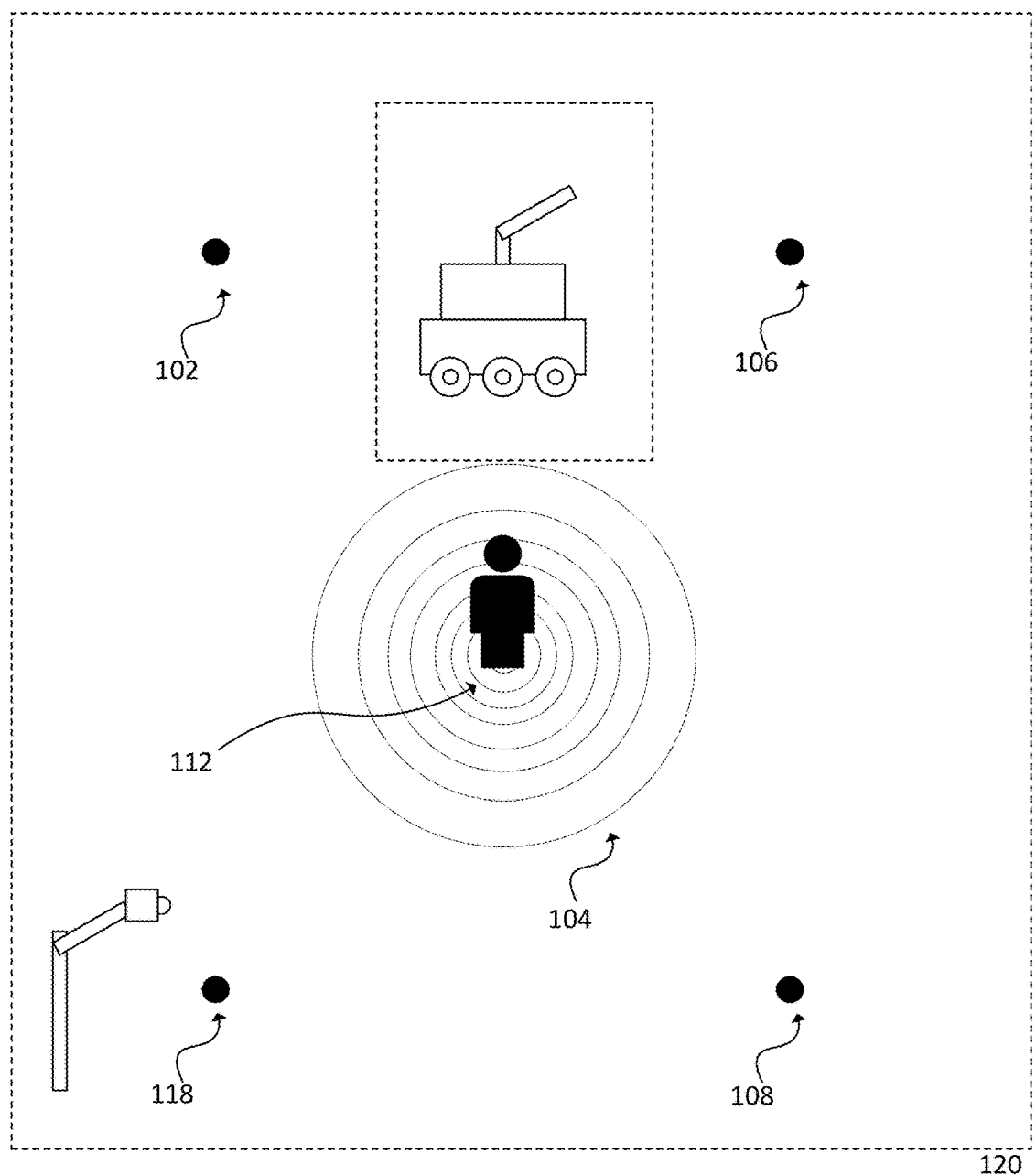
FIG. 1 depicts a localization system.

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A vibration sensor may be any sensor that is configured to detect a vibration and output an electrical signal representing the vibration. For example, an accelerometer may include a transducer that is configured to detect a vibration and output a corresponding electrical signal. A strain gauge within a circuit through which an electric current is flowing may be said to detect a vibration, and in response to the detected vibration, alter its internal resistance such that the electric current passing through the strain gauge in effect becomes the corresponding electric signal. An eddy-current or capacitive displacement sensor may be configured to detect a vibration and generate a corresponding signal representing the vibration. Various types of vibration sensors may be known, and the principles and methods disclosed herein may be implementable with any known vibration sensor.

The principles and methods for human localization will now be exemplarily disclosed with respect to an inertial measurement sensor (IMU). IMUs have become widely used for navigation systems, which has resulted in efficiencies of scale, such that inexpensive, high-performance IMUs are available. IMUs may be configured to measure specific force, angular rate, orientation of a body, or any of these. As a subset of their functions, IMUs may be configured as a vibration sensor, in which an IMU detects a vibration and outputs an electrical signal representing the vibration. As will be described in detail herein, a localization device may utilize IMUs to detect vibrations from human movement and to localize the human based on these detected vibrations. Based on the localization result, the localization device may implement a safety measure. In this manner, the device may permit robots to operate when humans are in a safe location with respect to the robots, or the device may slow or stop the robots, when the human is in a danger zone relative to the robots.

A device may localize a human based on the electrical signals that the vibration sensors (e.g. the IMUs) generate in response to detected vibrations by matching a vibration signature and triangulating the vibration signature with its source. Such vibration signature matching and localization may present at least three challenges. First, the localization device must be configured to be tolerant to certain perturbations. The electrical signals generated by the vibration detectors may be corrupted to varying degrees with vibration noise, such as from operating machines and/or other external factors. Any such localization device must be robust to perturbation vibration. Second, the localization device must be configured with accurate position information for its vibrations sensors. The localization device may be configured to localize a human based in part on the absolute locations of the sensors or the relative positions of the sensors (e.g. the positions of the sensors relative to one another), and errors in such position information will be propagated to the localization result. Finally, the localization device must be configured in an environment in which accurate vibration transmission speed is assessable (e.g. with a singular vibration transmission speed throughout the relevant area, or with multiple vibration transmission speeds that can be compensated for).

The localization device, system, and methods disclosed herein may be less expensive, simpler to installs, more flexible, or any of these, compared to the conventional cage-based systems or visual-based systems (e.g. LIDAR, cameras, laser curtain). Moreover, the localization device, system, and methods may be configured to localize humans using simplified computation, compared to other localization systems.

FIG. 1 depicts a localization system. In a first example, the localization system includes a first sensor 102, configured to detect a vibration 104 and generate a first electrical signal in response to the detection of the vibration 104; a second sensor 106, configured to detect a vibration and generate a second electrical signal in response to the detection of the vibration; a third sensor 108, configured to detect a vibration and generate a third electrical signal in response to the detection of the vibration; and a processor 110, configured to determine a position of a source 112 of the vibration based on the first electrical signal, the second electrical signal, and the third electrical signal.

In a second example, the localization system of the first example may optionally further include an artificial neural network 114, including an input layer, at least one middle layer, and an output layer: wherein the artificial neural network 114 is configured to receive the first electrical signal, the second electrical signal, and the third electrical signal at the Input layer; process the first electrical signal, the second electrical signal, and the third electrical signal through the one or more hidden layers; and generate from the output layer an output representing the position. In this configuration, the processor 110 determining the position may include the processor executing the neural network 114 to determine the position.

In a third example, the localization system of any of the above examples may optionally include includes a memory 116, on which are stored first location data, representing a location of the first sensor 102; second location data, representing a location of the second sensor 106; and third location data, representing a location of the third sensor 108; wherein the artificial neural network 114 is further configured to determine the position of the source 112 of the vibration based on the first location data, the second location data, and the third location data.

In a fourth example, the localization system of any of the above examples may optionally be configured such that the first sensor 102, the second sensor 106, and the third sensor 108 are each of a same sensor type. Optionally, the first sensor 102, the second sensor 106, and the third sensor 108 may each be IMU sensors.

In a fifth example, the localization system of any one of the above examples may optionally be configured wherein the processor 110 determining the position of the source 112 of the vibration based on the first electrical signal, the second electrical signal, and the third electrical signal includes the processor 110 determining a first time difference between generation of the first electrical signal and the second electrical signal; determining a second time difference between generation of the third electrical signal and either the first electrical signal or the second electrical signal; and determining the position of the source 112 of the vibration based in the first time difference and the second time difference.

In a sixth example, the localization system of any one of examples may optionally include a fourth sensor 118, different from each of the first sensor, the second sensor, and the third sensor, and configured to generate fourth sensor data representing the source of the vibration; wherein the position determined by the processor is a first position; wherein the processor is configured to determine a second position of the source of the vibration based on the fourth sensor data; and wherein the processor is configured to adjust a parameter of the artificial neural network based on a difference between the first position and the second position.

In a seventh example, the localization system of example six may optionally be configured wherein the processor 110 determining the second position of the source of the vibration based on the fourth sensor data 118 includes the processor 110 identifying a representation of a human in the fourth sensor data and determining a location of the identified representation of the human.

In an eighth example, the localization system of examples six or seven may optionally be configured wherein the processor 110 is configured to determine a likelihood that the source 112 of the vibration is a human identified in the representation of the human, and if the likelihood that the source of the vibration is the human is outside of a predetermined range, modify a parameter of the artificial neural network 114.

In a ninth example, the localization system of example eight may optionally be configured wherein the processor determining the likelihood that the source of the vibration is the human identified in the representation of the human includes the processor determining from the fourth sensor data when the human changes location, and determining the likelihood proportionally to a temporal relationship between the human changing location and generation of any of the first electrical signal, the second electrical signal, or the third electrical signal.

In a tenth example, the localization system of examples eight or nine may optionally be configured wherein the processor 110 determining the likelihood that the source 112 of the vibration is the human identified in the representation of the human includes the processor 110 determining from the fourth sensor data 118 whether the human changes location, if no human change of location is detected, modifying a parameter of the artificial neural network to disregard a detected vibration.

In an eleventh example, the localization system of any one of examples seven to ten, wherein the fourth sensor 118 is any of a Light Detection and Ranging (LIDAR) sensor; a Radio Detection and Ranging (RADAR), an image sensor, or a depth camera.

In a twelfth example, the localization system of any of the above example may be optionally configured wherein the processor 110 is further configured to determine an intersection of a first circle, having an origin at the first sensor and having a first radius; a second circle, having an origin at the second sensor, and having a second radius; and a third circle, having an origin at the third sensor, and having a third radius; wherein the second radius is determined as the first radius plus a value representing a time difference between generation of the first electrical signal and the second electrical signal; wherein the third radius is determined as the first radius plus a value representing a time difference between generation of the first electrical signal and the third electrical signal; and wherein the processor is configured to determine the first position of the source of the vibration based on a location of the determined intersection.

In a thirteenth example, the localization system of any of the above examples may be optionally further configured to include a first zone and a second zone; wherein, the processor 110 is configured to operate according to a first operational mode if the first position is within the first zone, and the processor is configured to operate according to a second operational mode if the first position is within the second zone.

In a fourteenth example, the localization system of the thirteenth example may be optionally configured wherein the processor 110 operating according to the first operational mode includes the processor 110 sending an alert instruction, and wherein the processor 110 operating according to the second operational mode includes the processor 110 not sending the alert instruction.

In a fifteenth example, the localization system of the fourteenth example may be optionally configured wherein the alert instruction is an instruction to implement a safety procedure, disable a machine, stop a process, sound an alarm, or any of these.

In a sixteenth example, the localization system of any one of examples one to fifteen may optionally include wherein the processor 110 is configured to determine the first position of the source 112 of the vibration if a magnitude of at least one of the first electrical signal, the second electrical signal, or the third electrical signal is within a predetermined range, and wherein the processor is configured not to determine the first position of the source 112 of the vibration if the magnitude of each of the first electrical signal, the second electrical signal, and the third electrical is outside of the predetermined range.

Not determining the first position of the source 112 of the vibration based on the predetermined range, as described above, may permit thresholds to be set for a given implementation, which may distinguish vibration sources that are likely to be human-generated from vibration sources that are unlikely to be human generated. In some situations, for example, various machines, robots, or otherwise may generate vibrations that whose magnitude is small compared to vibrations generated by human footsteps or work. In this instance, a threshold may be set between the magnitude(s) corresponding to machines and those corresponding to humans. A vibration of a magnitude beneath the threshold would be unlikely to result from a human and therefore the device may be configured not to localize the source of the vibration. Conversely, in other instances, machines or robots may be configured to generate vibrations of a greater magnitude than those corresponding to human action. In those instances, a threshold may be set, above which a vibration would be unlikely to result from a human, and therefore the device may be configured not to localize the source of the vibration.

In a seventeenth example, the localization system of any of the previous examples may optionally be configured wherein the first sensor 102, the second sensor 106, and the third sensor 108 are each placed at corners of a rectangular formation 120, at corners of a square formation, at corners of a triangular formation, or at corners of an irregular polygon formation.

Figure 2:
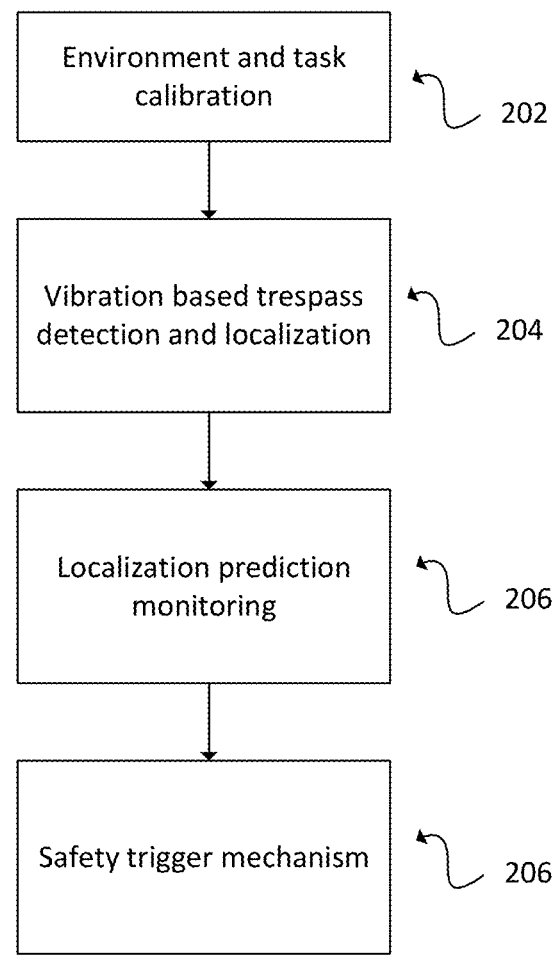
FIG. 2 depicts a procedure for performing a localization.

FIG. 2 depicts a procedure for performing a localization, according to an aspect of the disclosure, the procedure including environment and task calibration 202, vibration based trespass detection and localization 204, localization prediction monitoring 206, and safety trigger mechanism 206. With respect to the first procedure—environment and task calibration 202—the system may operate according to either or both of two general paradigms: (1) localization from vibration sensor data in which the additional sensor source is not available to train the relevant model; or (2) localization from vibration sensor data based on modeling/training with an additional sensor source (e.g. a reference data source, a trusted data source) such as a LIDAR sensor or camera data.

In the first paradigm, the source of the vibration may be localized by triangulating the signals using their respective time delta (e.g. when the signal was generated and/or when the signal was received by the one or more processors). In this scenario, the magnitude of the vibration as detected by the sensor (e.g. the amplitude of the sensor signal) may not be considered, since the magnitude of the signal may be affected by any of a variety of factors, such as variance in the medium in which the vibrations travel (e.g. variance in the flooring), objects in a vicinity of the sensors, the presence of the robot, or otherwise. Instead, the localization system may localize the source of the vibration using the incoming pattern and the time-deltas of the signals generated by multiple vibration sensors in response to a single stimulus (e.g. such as in response to a human moving).

Figure 3:
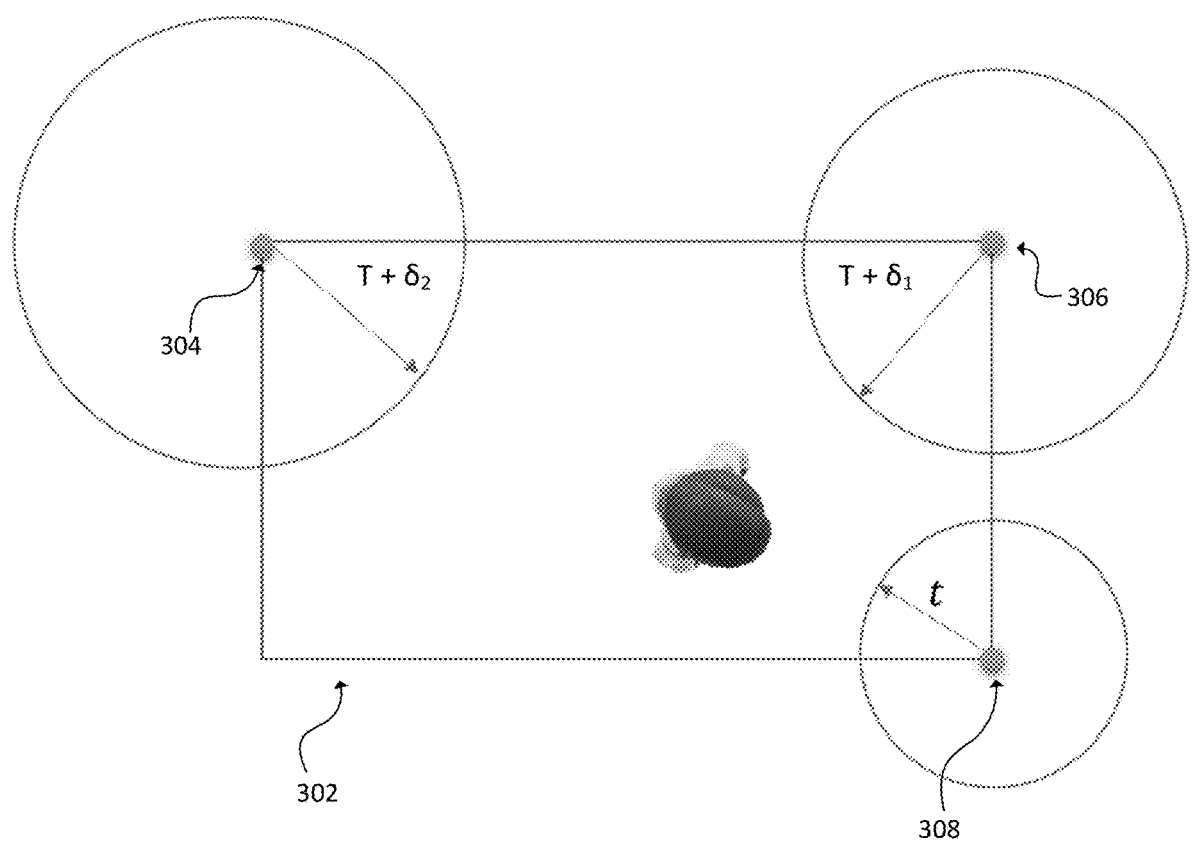
FIG. 3 depicts a localization based on time-delta of vibration-sensor signals.

FIG. 3 depicts a localization based on time-delta of vibration-sensor signals. In this figure, the detection area 302 is depicted as a rectangle, and the vibration sensors 304, 306, and 308 are located in at least three of the corners. Each of these sensors is configured to detect a vibration and output an electrical signal representing the detected vibration. The sensors will generally be expected to detect the vibration and output a corresponding electrical signal based on a proximity of the source of the vibration to the relative signal. For example, a sensor 308 closest to the source of the vibration will output its electrical signal first, followed by sensor 304 that is second closest to the source, followed by the sensor 306 that this third closest to the source, etc. Although this may generally occur in a given configuration, the sensors may be optionally configured such that a first signal detecting a vibration (e.g. detecting a vibration source) may send or cause to be sent a signal or message to the rest of the sensors, wherein the signal or message is an instruction to detect the vibration.

A processor may receive he outputs of the vibration sensors and detect a time-delta (e.g. a difference between a time when the first sensor detected the vibration and when another sensor detected the vibration) of the signals. In localizing based on the time-delta, it should be noted that the time for the vibration to reach the first sensor is generally unknown; nevertheless, the time-deltas between the first detection of the vibration/the first signal generation and generation of signals in the other vibration sensors may be used to localize the vibration's source.

The following describes the localization of the vibration according to an aspect of the disclosure. In this aspect, and for calculation purposes, an imaginary circle is created at every vibration sensor (e.g. at the corners of the rectangular zone). These circles have variable radii, depending of the time-delta computed by the processor. Thus, for the sensor 308 that is closest to the vibration source, (e.g., the first sensor), this sensor 308 will be the first to register the vibration. The other sensors will register the vibration thereafter, each with a respective time-delta compared to the registration by the first sensor. In an exemplary configuration having three sensors, these time deltas may be represented as $\delta\_1$ and $\delta\_2$ respectively.

The initial sizes of the circles are given by a variable t (time) plus $\delta\_1$ and $\delta\_2$. For example, the radius of the initial circles will be t for sensor one, t+$\delta\_1$ for sensor two, and t+$\delta\_2$ for sensor three. Thus, the smallest circle (the circle around 308) will have the sensor 308 closest to the source of vibration (corresponding to sensor one) as its focus; the second closest sensor 304 (corresponding to sensor two) will be the focus of the second smallest circle; the third closest sensor (corresponding to sensor three) will be the focus of the third smallest circle, etc. The radio of each of these circles is iteratively increased, such that their ranking in size remains unchanged (e.g. such that the smallest circle always remains the smallest; the second smallest circle always remains the second smallest; and so on).

Figure 4A:
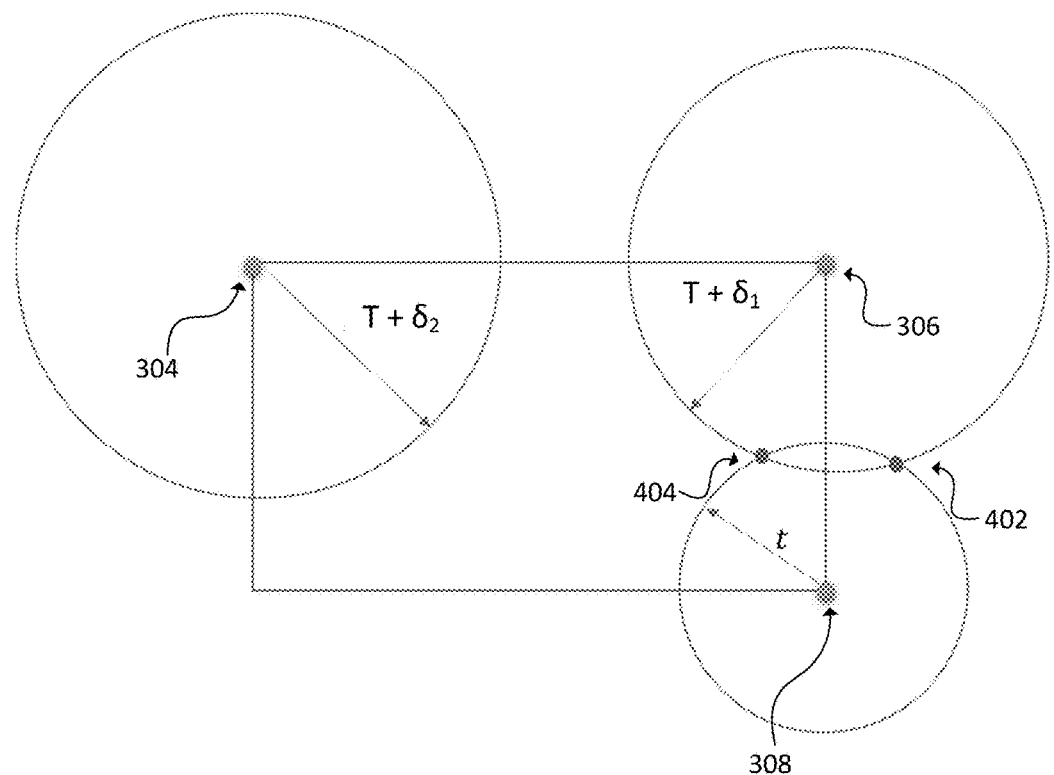
FIGS. 4A, 4B, and 4C depict an iterative increase in circle size with intersection determination.
Figure 4B:
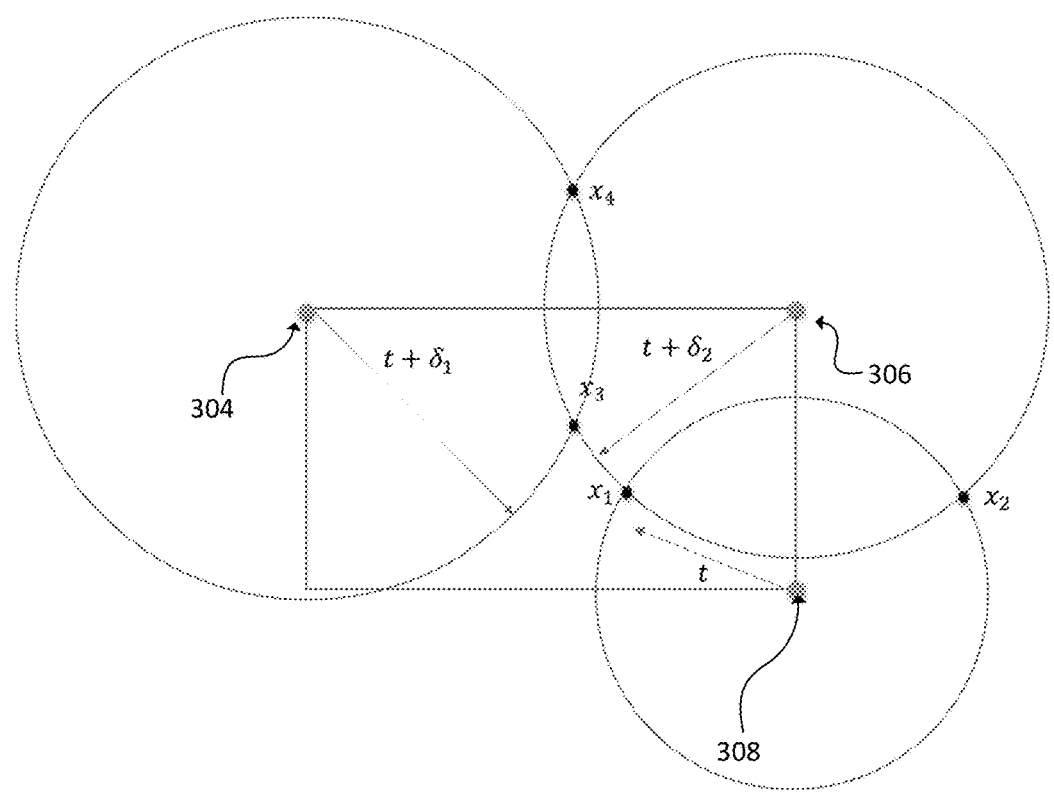
Figure 4C:
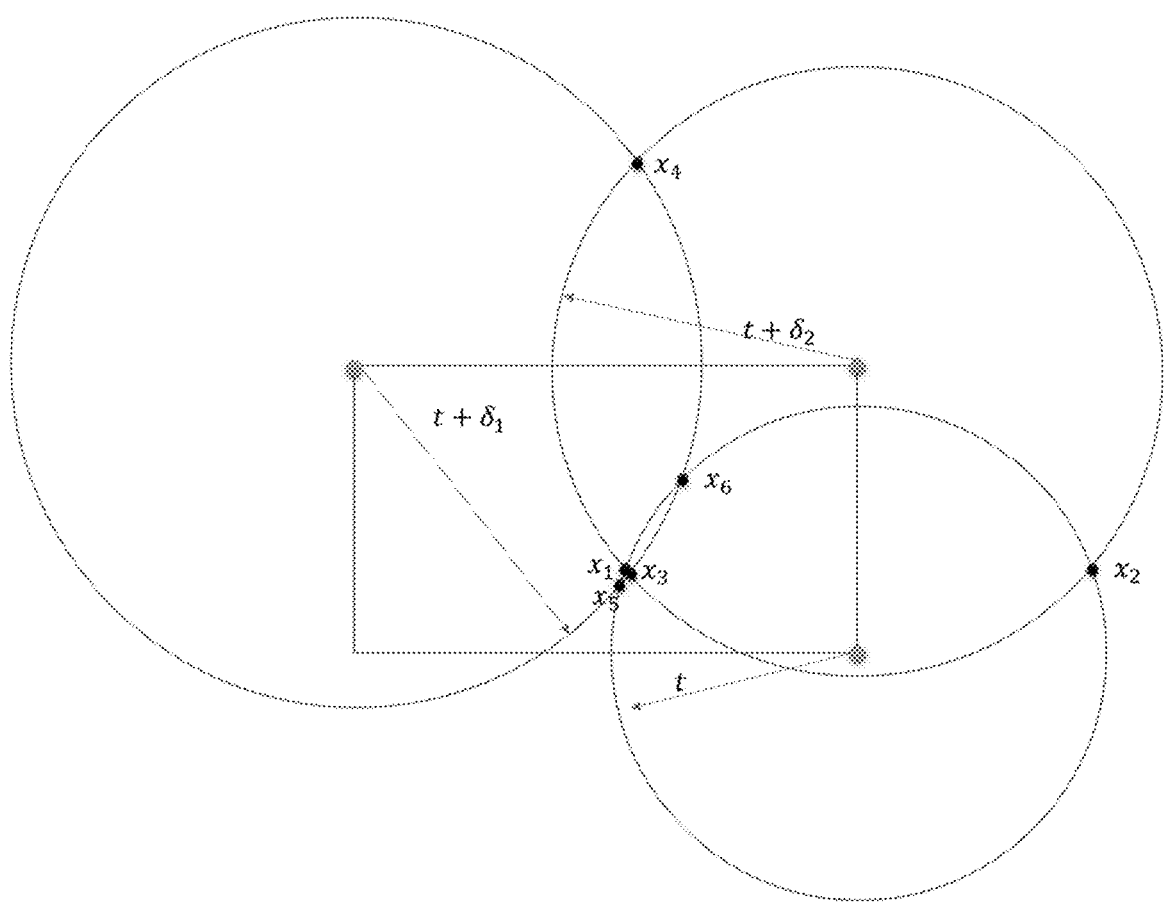

FIGS. 4A, 4B, and 4C depict an iterative increase in circle size with intersection determination. The processor may be configured to generate these circles (e.g. generate data representing these circles). The processor may be configured to search for points of intersection among the circles. FIG. 4A depicts the circles of FIG. 3 during an iterative size increase. In this depiction, the processor increases the circles with foci 304, 306, and 308 and searches for points of intersection. In FIG. 4A, each of the circles with foci 304, 306, and 308 have been iteratively increased such that circles with foci 306 and 308 intersect at points 402 and 404. The processor may be configured to determine that there are no points of intersection with each of the circles (e.g. there is no intersection with the circle having a focus 304). The processor may be configured to continue to iteratively increase the circles' radius until there are points of intersection with each circle.

Continuing this example, and as depicted in FIG. 4B, the processor has continued to iteratively increase the size of each circle, such that there are now points of intersection between the circle with focus 304 and the circle with focus 306, and between the circle with focus 306 and the circle with focus 308. There are, however, no points of intersection for each of the three circles. The processor may be configured to continue to iteratively increate the circles' radii until there is at least one point of intersection between each of the circles.

In FIG. 4C, the processor has increased the circles until each of the circles intersect with each of the other circles. In this exemplary three-circle structure, this would be expected to yield six points of intersection, as depicted in FIG. 4C by points $x_1$, $x_2$, $x_3$, $x_4$, $x_5$, and $x_6$. The processor may then be configured to determine these six intersection points. The processor may be further configured to take sets of three and generate corresponding circles with all possible combinations. The processor may be configured to determine the smallest resulting circle, and the estimated position is given by the center of that circle.

As stated above, the processor determines the initial circle radius based on the time-delta representing the difference in time between when a first sensor detects a vibration and when another sensor detects the vibration. The relationship between time-delta and radius is largely installation dependent, as it will depend at least on a distance between the sensors. That is, sensors that are far apart will require a larger distance per unit of time-delta, as compared to sensors that are close together. The relationship between time-delta and radius, or otherwise stated, the increment of radius per unit of time-delta, may be selected in advance using estimations, or as part of a training. In such a training, an arbitrary increment of radius per unit of time-delta may be selected for a known vibration source, and the resulting localization can be compared to the location of the known vibration source. Based on this comparison, the increment of radius per unit of time-delta may be altered or accepted.

Figure 5:
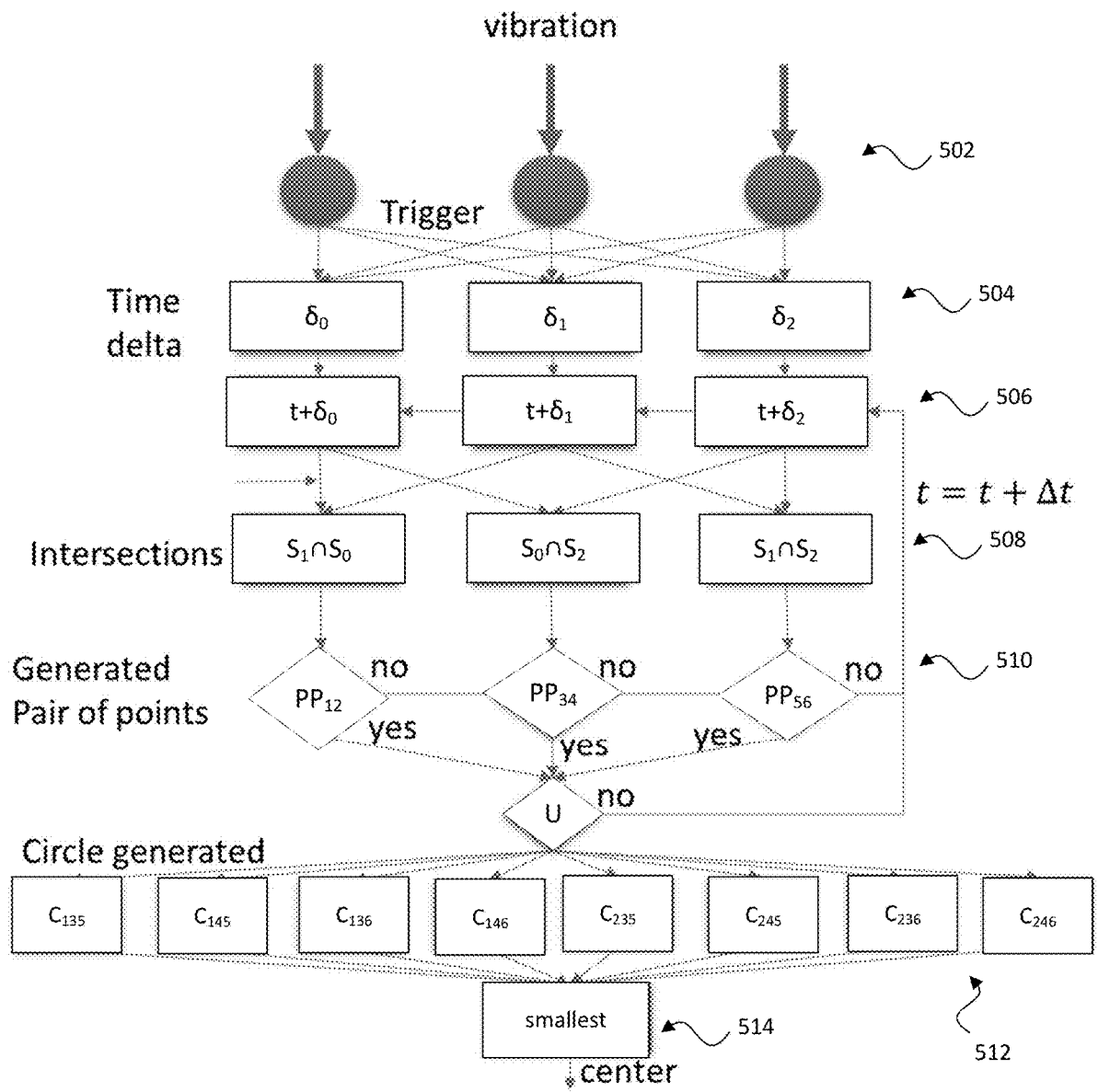
FIG. 5 depicts a procedure for vibration source localization.

FIG. 5 depicts a procedure for vibration source localization, according to an aspect of the disclosure. In this exemplary procedure, three vibration sensors are utilized to localize the source of a vibration; however, the principles and methods disclosed herein are applicable to implementations of more than three sensors. In this figure, the three sensors are depicted as three solid circles at 502. A first of the three sensors detects a vibration and may optionally trigger the remaining sensors to detect the vibration. In 504, a time delta is calculated between the first sensor to detect the vibration and the remaining sensors to detect the vibration. In this manner, $\delta\_0$ represents a detection by the first sensor to detect the vibration; $\delta\_1$ represents a time difference between the first sensor's detection of the vibration and a second sensor's detection of the vibration; and $\delta\_2$ represents a time difference between the first sensor's detection of the vibration and a third sensor's detection of the vibration.

One or more processors may be configured to generate or calculate a circle around each of the 3 sensors, such that a location of each of the 3 sensors is the focus of the respective circle. The radius of the circle is calculated as t+delta_n as depicted in 506, such that the radius of the circle around the first sensor begins as t; the radius of the circle around the second sensor begins as t+delta_one; and the radius of the circle around the third sensor begins as t+delta_two. The one or more processors may even be configured to determine whether intersections exist between each of the 3 circles, such as intersections between a first circle (shown as $S_0$) and a second circle (shown as $S_1$), between a first circle and a third circle (shown as $S_2$), and between the second circle and the third circle. If each circle intersects with each of the other circles, then the procedure continues to step 512. If each circle does not intersect with each of the other circles, then the procedure returns to step 506, in which the value of t is incremented, thereby increasing the radius of each of the 3 circles. This procedure continues until each of the 3 circles intersect with each other.

Two intersecting circles result in two intersection points, and therefore the three circles intersecting with one another result in 6 points of intersection, which may be numbered 1, 2, 3, 4, 5, and 6, accordingly. The one or more processors may then be configured to generate 8 circles out of these respective points, such that circles are generated with points 135, 145, 136, 146, 235, 245, 236, and 246, as in step 512. The one or more processors may then be configured to determine a smallest of these 8 generated circles 514. The source of the vibration is then localized as the focus of the smallest of these 8 generated circles.

Self-Supervised Training Using Existing Lidar or Camera Sensors.

According to the second paradigm, the localization device or system may be trained in a self-supervised training. In this aspect, an additional device is necessary to determine an actual location of the source of the vibration, and the estimated localization is trained by being compared to the actual location. In an exemplary configuration, the additional device may be a LIDAR device or one or more cameras. The additional device may operate in conjunction with one or more processors to detect a vicinity of the additional device and generate data representing the vicinity of the device. One or more processors may be configured to identify in this data a source of the vibration and to determine a location of the source of the vibration. This location may be an absolute location, a location relative to the additional device, or otherwise. The additional device in conjunction with the one or more processors may be configured to determine the location of the source of the vibration using photogrammetry, or any other known technique for localizing using such sensor data.

In one configuration, the device may localize the source of the vibration using self-supervised training and one or more artificial neural networks. In this manner, the one or more processors may be configured to access an artificial neural network which may be stored on a memory. The artificial neural network may utilize any known artificial neural network structure or techniques. According to one aspect, the artificial neural network may include an input layer, one or more hidden layers, and an output layer. The artificial neural network may be configured to receive data representing timings of vibration sensor detection of a vibration source (e.g. actual timings, time delta as, or any other data representing a timing), process these data within the one or more hidden layers according to predetermined weights, and output a predicted localization of the vibration source.

The artificial neural network may be configured to receive the absolute location of the vibration source, as determined by the additional device (e.g. a LIDAR device, one or more cameras etc.). The artificial neural network may be configured to determine an error between the absolute location and the predicted location, and to modify one or more weights of the artificial neural network accordingly. This procedure may be repeated until an error between the predicted location and the absolute location is within an acceptable tolerance. In this manner, the artificial neural network is recalibrated until acceptable predictions are achieved.

In an alternate configuration, the circle-based system as described above may be configured using an absolute location from the additional device. As stated above, the initial value of t, corresponding to an initial size of the radius, may be dependent on a given implementation, such as on a distance between the sensors. Similarly, the unit of increased radius, t+n, per unit of time-delta may also be implementation specific. Variations in an initial t value and/or variations in the unit of increased radius per unit of time delta may change the estimated localization of the localization device. By comparing the estimated localization with the absolute localization from the additional device (e.g. a LIDAR device, one or more cameras, etc.), the localization device may change the initial t value and/or the unit of increased radius per unit of time delta, to reduce a difference between the estimated localization in the absolute localization. This may be performed repeatedly until a difference between the estimated localization in the absolute localization is within an acceptable tolerance.

Figure 6:
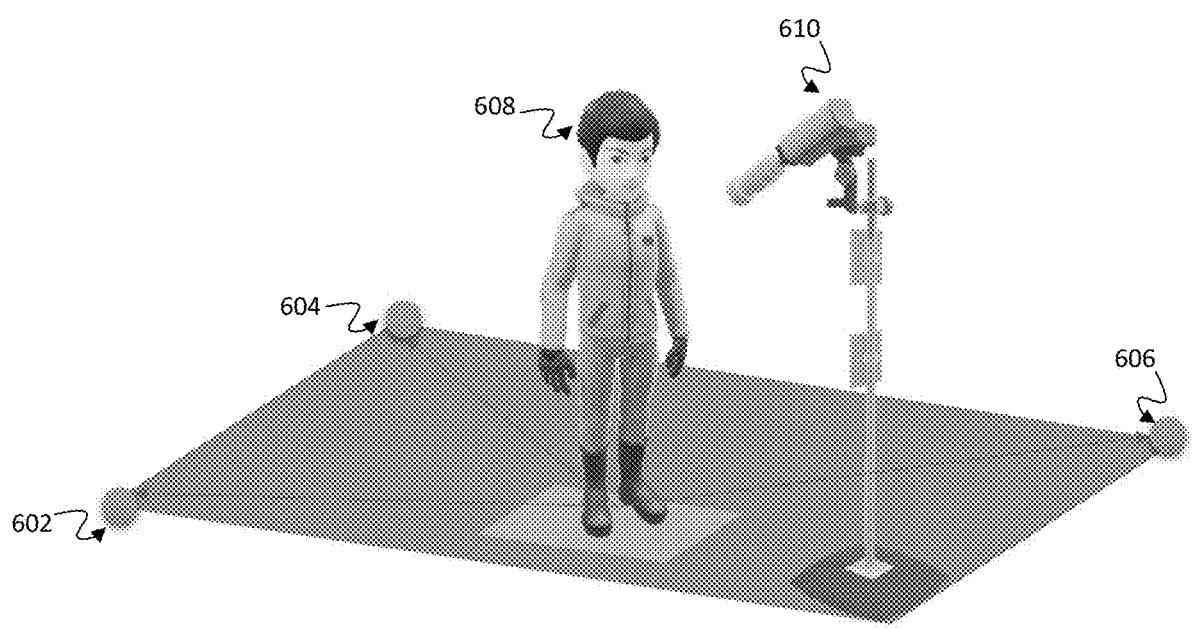
FIG. 6 depicts a self-supervised localization configuration procedure.

FIG. 6 depicts a self-supervised localization configuration procedure, according to an aspect of the disclosure. In this figure, three sensors 602, 640, and 606, are located at three corners of a rectangular localization area. A source of a vibration, in this case a human being, 608, generates a vibration, such as by moving or walking. The three sensors register the vibration, and using any procedure described above (e.g. The circle-based technique, localization using an artificial neural network, etc.), the localization device generates an estimated localization of the source of the vibration 608. The additional device, in this case a LIDAR device, 610, determines a location of the vibration source (e.g. an absolute location, a location relative to the additional device, or otherwise). The one or more processors (optionally by implementing the artificial neural network) compares the estimated localization of the vibration source to the localization of the vibration source as determined by the additional device (e.g. LIDAR, one or more cameras, etc.), and determines an error between these values. The one or more processors may be configured to adjust one or more parameters (e.g. such as adjusting one or more weights of the artificial neural network) to reduce the error between these values. This procedure may be performed repeatedly until an error between the estimated localization and the localization as determined by the additional device is within a predetermined tolerance.

Optionally, the self-supervised training may be configured to additionally receive and utilize data representing an amplitude of the detected vibration. In this manner, an artificial neural network may be configured to receive both data representing an amplitude of the detected vibrations and data representing the time-delta. Since the amplitude would be expected to vary among the sensors, based at least on distance between the sensor and the source of the vibration, the neural network may also be trained to take the amplitude information into account when rendering a predicted localization.

Detecting the Position in a Multimodal Approach:

Although the above examples describe localization only with respect to the use vibration sensors (or training of localization with respect to vibration sensors and another sensor type), the localization device may be configured to localize using one or more combinations of sensors, such as, for example, vibrations combined with a camera for human pose estimation or bounding box detection. In such cases, the procedures described herein may take advantage of both estimations to train a neural model.

Zones

The principles and methods disclosed herein may be implemented to prevent human injury resulting from a machine/robot. In many installations, it may not be necessary to render a highly accurate predicted localization (e.g. the source of the vibration may not need to be detected with a high degree of accuracy). Instead, it may be satisfactory for the source of the vibration to be localized with one of two or three zones. For example, and analogous to the cage and laser curtain examples provided above, the working environment may be divided into a binary environment, such as a safe zone and a danger zone. If the processor localizes the source of the vibration in a safe zone, the processor may cause the robot to operate according to a first operational mode. If the processor localizes the source of the vibration in a danger zone, the processor may cause the robot to operate according to a second operational mode. In this case, the first operational mode may be a mode in which the robot operates normally, and the second operational mode may be a mode in which the robot operates in a safety mode, slowly, in a diminished capacity, or is disabled.

In some configurations, it may be desired to utilize three safety zones, such as a safe zone, a warning zone, and a danger zone. In this manner, if the processor localizes the source of the vibration within the safety zone, the processor may cause the robot to operate according to the first operational mode. If the processor localizes the source of the vibration within the danger zone, the processor may cause the robot to operate according to the second operational mode. If the processor localizes the source of the vibration within the warning zone, the processor may cause the robot to operate according to a third operational mode. In this manner, the third operational mode may correspond with a safety mode or a mode in which the robot operates more slowly or otherwise in a diminished capacity, and the second operational mode may represent a disabling or turning off of the robot.

Figure 7:
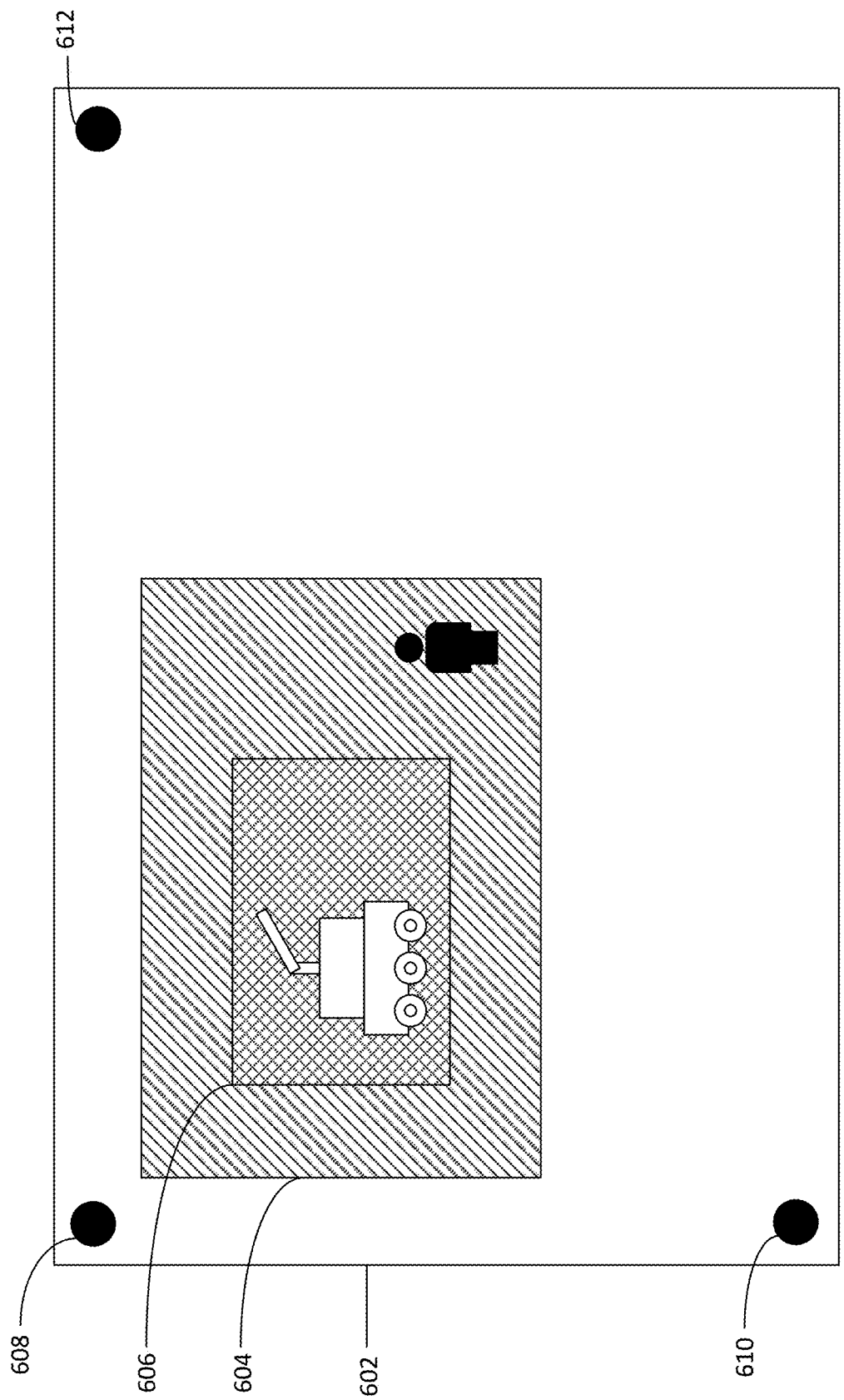
FIG. 7 depicts an implementation with multiple safety zones.

FIG. 7 depicts an implementation with multiple safety zones, as described above. In this particular configuration, the working environment is delineated into a safe zone 602, a warning zone 604, and a danger zone 606. The sensors are depicted as 608, 610, and 612. Using the principles and methods disclosed herein, the processor may receive the sensor data and generate an estimated localization of the source of the vibration (depicted herein as a human). The estimated localization may correspond to a zone in a plurality of zones, such as the safe zone 602, the warning zone 604, or the danger zone 606. In this instance, the source of vibration is localized as being within the warning zone 604, for demonstrative purposes. As described above, and depending on the zone in which the source of the vibration is localized, the processor may operate according to a corresponding operational mode. Obviously, the number of zones is not limited to 3, but any number of zones may be implemented in a given environment.

Figure 8:
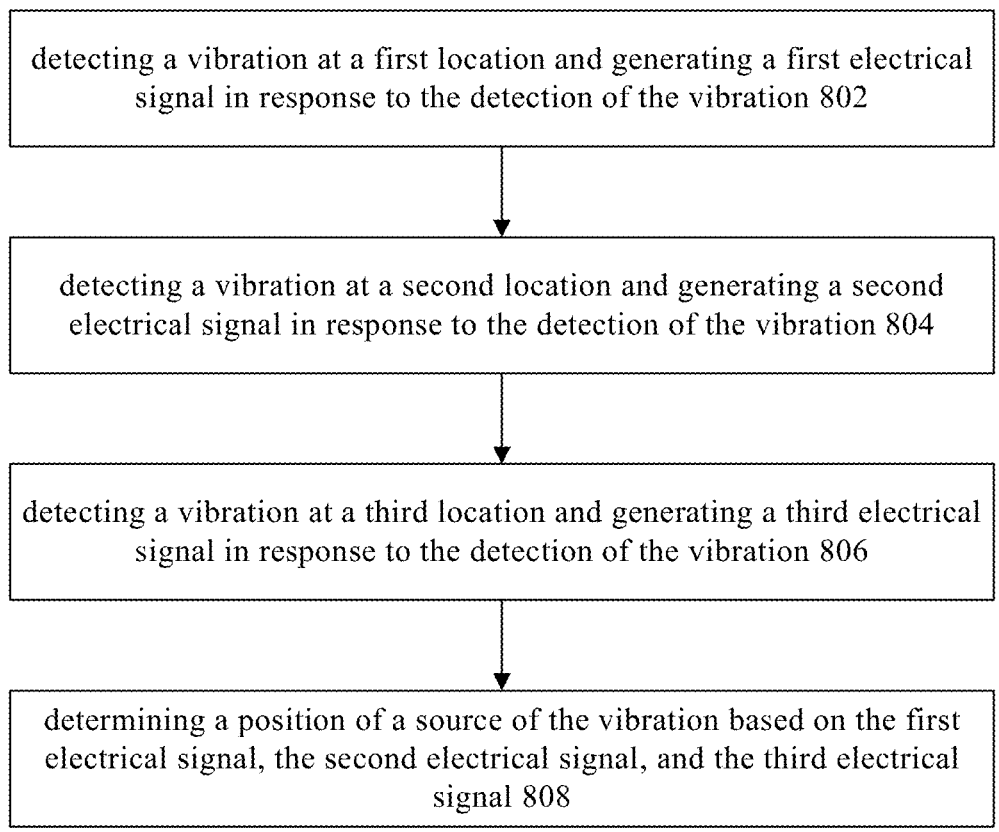
FIG. 8 depicts a method of localization.

FIG. 8 depicts a method of localization, including detecting a vibration at a first location and generating a first electrical signal in response to the detection of the vibration 802; detecting a vibration at a second location and generating a second electrical signal in response to the detection of the vibration 804; detecting a vibration at a third location and generating a third electrical signal in response to the detection of the vibration 806; and determining a position of a source of the vibration based on the first electrical signal, the second electrical signal, and the third electrical signal 808.

The method may optionally further include wherein determining the position of the source of the vibration based on the first electrical signal, the second electrical signal, and the third electrical signal includes determining a first time difference between generation of the first electrical signal and the second electrical signal; determining a second time difference between generation of the third electrical signal and either the first electrical signal or the second electrical signal; and determining the position of the source of the vibration based in the first time difference and the second time difference.

The principles and methods described herein may advantageously provide a low cost solution for localizing humans in a vicinity of a robot. The use of vibration sensors for this purpose may be particularly advantageous in environments with poor visibility, such as with dust, fog, or otherwise. In such environments, a LIDAR device or an image sensor are likely to provide suboptimal sensor data; however, the vibration sensors will be unaffected.

Additional aspects of the disclosure will be provided below by way of Example:

In Example 1, a localization system, including: a first sensor, configured to detect a vibration and generate a first electrical signal in response to the detection of the vibration; a second sensor, configured to detect a vibration and generate a second electrical signal in response to the detection of the vibration; a third sensor, configured to detect a vibration and generate a third electrical signal in response to the detection of the vibration; and a processor, configured to determine a position of a source of the vibration based on the first electrical signal, the second electrical signal, and the third electrical signal.

In Example 2, the localization system of Example 1, further including an artificial neural network, including an input layer, at least one middle layer, and an output layer; wherein the artificial neural network is configured to: receive the first electrical signal, the second electrical signal, and the third electrical signal at the input layer; process the first electrical signal, the second electrical signal, and the third electrical signal through the one or more hidden layers; and generate from the output layer an output representing the position.

In Example 3, the localization system of Example 2, wherein the processor determining the positon includes the processor executing the neural network to determine the position.

In Example 4, the localization system of Example 2 or 3, further including a memory, on which are stored first location data, representing a location of the first sensor; second location data, representing a location of the second sensor; and third location data, representing a location of the third sensor; wherein the artificial neural network is further configured to determine the position of the source of the vibration based on the first location data, the second location data, and the third location data.

In Example 5, the localization system of any one of Examples 1 to 4, wherein the first sensor, the second sensor, and the third sensor are each of a same sensor type.

In Example 6, the localization system of any one of Examples 1 to 5, wherein the first sensor, the second sensor, and the third sensor are each inertial measurement unit sensors.

In Example 7, the localization system of any one of Examples 1 to 6, wherein the processor determining the position of the source of the vibration based on the first electrical signal, the second electrical signal, and the third electrical signal includes the processor: determining a first time difference between generation of the first electrical signal and the second electrical signal; determining a second time difference between generation of the third electrical signal and either the first electrical signal or the second electrical signal; and determining the position of the source of the vibration based in the first time difference and the second time difference.

In Example 8, the localization system of any one of Examples 2 to 7, further including a fourth sensor, different from each of the first sensor, the second sensor, and the third sensor, and configured to generate fourth sensor data representing the source of the vibration; wherein the position determined by the processor is a first position; wherein the processor is configured to determine a second position of the source of the vibration based on the fourth sensor data; and wherein the processor is configured to adjust a parameter of the artificial neural network based on a difference between the first position and the second position.

In Example 9, the localization system of Example 8, wherein the processor determining the second position of the source of the vibration based on the fourth sensor data includes the processor identifying a representation of a human in the fourth sensor data and determining a location of the identified representation of the human.

In Example 10, the localization system of Example 8 or 9, wherein the processor is configured to determine a likelihood that the source of the vibration is a human identified in the representation of the human, and if the likelihood that the source of the vibration is the human is outside of a predetermined range, modify a parameter of the artificial neural network.

In Example 11, the localization system of Example 10, wherein the processor determining the likelihood that the source of the vibration is the human identified in the representation of the human includes the processor determining from the fourth sensor data when the human changes location, and determining the likelihood proportionally to a temporal relationship between the human changing location and generation of any of the first electrical signal, the second electrical signal, or the third electrical signal.

In Example 12, the localization system of Example 10 or 11, wherein the processor determining the likelihood that the source of the vibration is the human identified in the representation of the human includes the processor determining from the fourth sensor data whether the human changes location, if no human change of location is detected, modifying a parameter of the artificial neural network to disregard a detected vibration.

In Example 13, the localization system of any one of Examples 9 to 12, wherein the fourth sensor is any of a Light Detection and Ranging (LIDAR) sensor; a Radio Detection and Ranging (RADAR), an image sensor, or a depth camera.

In Example 14, the localization system of any one of Examples 1 to 13, wherein the processor is further configured to determine an intersection of a first circle, having an origin at the first sensor and having a first radius; a second circle, having an origin at the second sensor, and having a second radius; and a third circle, having an origin at the third sensor, and having a third radius; wherein the second radius is determined as the first radius plus a value representing a time difference between generation of the first electrical signal and the second electrical signal; wherein the third radius is determined as the first radius plus a value representing a time difference between generation of the first electrical signal and the third electrical signal; and wherein the processor is configured to determine the first position of the source of the vibration based on a location of the determined intersection.

In Example 15, the localization system of any one of Examples 1 to 14, further including a first zone and a second zone; wherein, the processor is configured to operate according to a first operational mode if the first position is within the first zone, and the processor is configured to operate according to a second operational mode if the first position is within the second zone.

In Example 16, the localization system of Example 15, wherein the processor operating according to the first operational mode includes the processor sending an alert instruction, and wherein the processor operating according to the second operational mode includes the processor not sending the alert instruction.

In Example 17, the localization system of Example 16, wherein the alert instruction is an instruction to implement a safety procedure, disable a machine, stop a process, sound an alarm, or any of these.

In Example 18, the localization system of any one of Examples 1 to 17, wherein the processor is configured to determine the first position of the source of the vibration if a magnitude of at least one of the first electrical signal, the second electrical signal, or the third electrical signal is within a predetermined range, and wherein the processor is configured not to determine the first position of the source of the vibration if the magnitude of each of the first electrical signal, the second electrical signal, and the third electrical is outside of the predetermined range.

In Example 19, the localization system of any one of Examples 1 to 18, wherein the first sensor, the second sensor, and the third sensor are each placed at corners of a rectangular formation, at corners of a square formation, at corners of a triangular formation, or at corners of an irregular polygon formation.

In Example 20, a localization system, including: a sensor structure configured to detect a vibration in its environment from three different locations and to generate corresponding detection signals; and a processor, configured to determine a position of a source of the vibration based on the detection signals provided by the sensor structure, the detection signals representing the detection of the vibration from three different locations.

In Example 21, the localization system of Example 20, further including an artificial neural network, including an input layer, at least one middle layer, and an output layer; wherein the artificial neural network is configured to: receive the detection signals at the input layer; process the detection signals through the one or more hidden layers; and generate from the output layer an output representing the position.

In Example 22, the localization system of Example 21, wherein the processor determining the positon includes the processor executing the neural network to determine the position.

In Example 23, the localization system of Example 21 or 22, further including a memory, on which are stored location data representing a location of each sensor of the sensor structure; wherein the artificial neural network is further configured to determine the position of the source of the vibration based on the location data.

In Example 24, the localization system of any one of Examples 20 to 23, wherein each sensor of the sensor structure is of a same sensor type.

In Example 25, the localization system of any one of Examples 20 to 24, wherein each sensor of the sensor structure is an inertial measurement unit sensor.

In Example 26, the localization system of any one of Examples 20 to 25, wherein the processor determining the position of the source of the vibration based on the detection signals includes the processor: determining a first time difference between generation of a first detection signal and a second detection signal; determining a second time difference between generation of a third detection signal and either the first detection signal or the second detection signal; and determining the position of the source of the vibration based in the first time difference and the second time difference.

In Example 27, the localization system of any one of Examples 21 to 26, wherein each sensor of the sensor structure is a first sensor; further including a second sensor, different from the first sensors, and configured to generate second sensor data representing the source of the vibration; wherein the position determined by the processor is a first position; wherein the processor is configured to determine a second position of the source of the vibration based on the second sensor data; and wherein the processor is configured to adjust a parameter of the artificial neural network based on a difference between the first position and the second position.

In Example 28, the localization system of Example 27, wherein the processor determining the second position of the source of the vibration based on the second sensor data includes the processor identifying a representation of a human in the second sensor data and determining a location of the identified representation of the human.

In Example 29, the localization system of Example 27 or 28, wherein the processor is configured to determine a likelihood that the source of the vibration is the human in the identified representation of the human, and if the likelihood that the source of the vibration is the human is outside of a predetermined range, modify a parameter of the artificial neural network.

In Example 30, the localization system of Example 29, wherein the processor determining the likelihood that the source of the vibration is the human identified in the representation of the human includes the processor determining from the second sensor data when the human changes location, and determining the likelihood proportionally to a temporal relationship between the human changing location and generation of any of the detection signals.

In Example 31, the localization system of Example 29 or 30, wherein the processor determining the likelihood that the source of the vibration is the human identified in the representation of the human includes the processor determining from the second sensor data whether the human changes location; and if no human change of location is detected, modifying a parameter of the artificial neural network to disregard a detected vibration.

In Example 32, the localization system of any one of Examples 28 to 31, wherein the second sensor is any of a Light Detection and Ranging (LIDAR) sensor; a Radio Detection and Ranging (RADAR), an image sensor, or a depth camera.

In Example 33, the localization system of any one of Examples 20 to 32, wherein the processor is further configured to determine an intersection of a first circle, having an origin at a first sensor or the sensor structure and having a first radius; a second circle, having an origin at a second sensor of the sensor structure, and having a second radius; and a third circle, having an origin at a third sensor of the sensor structure, and having a third radius; wherein the second radius is determined as the first radius plus a value representing a time difference between generation of the first electrical signal and the second electrical signal; wherein the third radius is determined as the first radius plus a value representing a time difference between generation of the first electrical signal and the third electrical signal; and wherein the processor is configured to determine the first position of the source of the vibration based on a location of the determined intersection.

In Example 34, the localization system of any one of Examples 20 to 33, further including a first zone and a second zone; wherein, the processor is configured to operate according to a first operational mode if the first position is within the first zone, and the processor is configured to operate according to a second operational mode if the first position is within the second zone.

In Example 35, the localization system of Example 34, wherein the processor operating according to the first operational mode includes the processor sending an alert instruction, and wherein the processor operating according to the second operational mode includes the processor not sending the alert instruction.

In Example 36, the localization system of Example 35, wherein the alert instruction is an instruction to implement a safety procedure, disable a machine, stop a process, sound an alarm, or any of these.

In Example 37, the localization system of any one of Examples 20 to 36, wherein the processor is configured to determine the first position of the source of the vibration if a magnitude of any of the detection signals is within a predetermined range, and wherein the processor is configured not to determine the first position of the source of the vibration if the magnitude of each of the detection signals is outside of the predetermined range.

In Example 38, the localization system of any one of Examples 20 to 37, wherein each sensor of the sensor structure is placed at corners of a rectangular formation, at corners of a square formation, at corners of a triangular formation, or at corners of an irregular polygon formation.

In Example 39, a method of localization, including: detecting a vibration at a first location and generating a first electrical signal in response to the detection of the vibration; detecting a vibration at a second location and generating a second electrical signal in response to the detection of the vibration; detecting a vibration at a third location and generating a third electrical signal in response to the detection of the vibration; and determining a position of a source of the vibration based on the first electrical signal, the second electrical signal, and the third electrical signal.

In Example 40, the method of localization of Example 39, wherein determining the position of the source of the vibration based on the first electrical signal, the second electrical signal, and the third electrical signal includes: determining a first time difference between generation of the first electrical signal and the second electrical signal; determining a second time difference between generation of the third electrical signal and either the first electrical signal or the second electrical signal; and determining the position of the source of the vibration based in the first time difference and the second time difference.

In Example 41, the method of localization of any one of Examples 39 to 40, wherein the determined position is a first position; further including: determining a second position of the source of the vibration using additional sensor data; and adjusting a parameter used to determine the first position based on a difference between the first position and the second position.

In Example 42, the method of localization of Example 41, wherein determining the second position of the source of the vibration includes identifying a representation of a human in the additional sensor data and determining a location of the identified representation of the human.

In Example 43, the method of localization of Example 41 or 42, further including determining a likelihood that the source of the vibration is the human of the identified representation of the human, and if the likelihood that the source of the vibration is the human is outside of a predetermined range, modifying a parameter of the artificial neural network.

In Example 44, the method of localization of Example 43, wherein determining the likelihood that the source of the vibration is the human includes determining from the additional sensor data when the human changes location, and determining the likelihood proportionally to a temporal relationship between the human changing location and generation of any of the first electrical signal, the second electrical signal, or the third electrical signal.

In Example 45, the method of localization of Example 43 or 44, wherein the determining the likelihood that the source of the vibration is the human includes determining from the additional sensor data whether the human changes location, if no human change of location is detected, modifying a parameter of the artificial neural network to disregard a detected vibration.

In Example 46, the method of localization of any one of Examples 39 to 45, further including determining an intersection of a first circle, having an origin at the first location and having a first radius; a second circle, having an origin at the second location, and having a second radius; and a third circle, having an origin at the third location, and having a third radius; wherein the second radius is determined as the first radius plus a value representing a time difference between generation of the first electrical signal and the second electrical signal; wherein the third radius is determined as the first radius plus a value representing a time difference between generation of the first electrical signal and the third electrical signal; and determining the position of the source of the vibration based on a location of the determined intersection.

In Example 47, the method of localization of any one of Examples 39 to 46, further including a first zone and a second zone; further including operating according to a first operational mode if the first position is within the first zone, and operating according to a second operational mode if the first position is within the second zone.

In Example 48, the method of localization of Example 47, wherein operating according to the first operational mode includes sending an alert instruction, and wherein operating according to the second operational mode includes not sending the alert instruction.

In Example 49, the method of localization of Example 48, wherein the alert instruction is an instruction to implement a safety procedure, disable a machine, stop a process, sound an alarm, or any of these.

In Example 50, the method of localization of any one of Examples 39 to 49, further including determining the first position of the source of the vibration if a magnitude of at least one of the first electrical signal, the second electrical signal, or the third electrical signal is within a predetermined range, and not determining the first position of the source of the vibration if the magnitude of each of the first electrical signal, the second electrical signal, and the third electrical is outside of the predetermined range.

In Example 51, the method of localization of any one of Examples 39 to 50, wherein the first location, the second location, and the third location are each at corners of a rectangular formation, at corners of a square formation, at corners of a triangular formation, or at corners of an irregular polygon formation.

In Example 52, a non-transitory computer readable medium, including instructions which, if executed, cause one or more processor to: detect a vibration at a first location and generating a first electrical signal in response to the detection of the vibration; detect a vibration at a second location and generating a second electrical signal in response to the detection of the vibration; detect a vibration at a third location and generating a third electrical signal in response to the detection of the vibration; and determine a position of a source of the vibration based on the first electrical signal, the second electrical signal, and the third electrical signal.

In Example 53, the non-transitory computer readable medium of Example 52, wherein determining the position of the source of the vibration based on the first electrical signal, the second electrical signal, and the third electrical signal includes: determining a first time difference between generation of the first electrical signal and the second electrical signal; determining a second time difference between generation of the third electrical signal and either the first electrical signal or the second electrical signal; and determining the position of the source of the vibration based in the first time difference and the second time difference.

In Example 54, the non-transitory computer readable medium of any one of Examples 52 to 53, wherein the determined position is a first position; and wherein the instructions are further configured to cause the one or more processors to: determine a second position of the source of the vibration using additional sensor data; and adjust a parameter used to determine the first position based on a difference between the first position and the second position.

In Example 55, the non-transitory computer readable medium of Example 54, wherein determining the second position of the source of the vibration includes the one or more processors identifying a representation of a human in the additional sensor data and determining a location of the identified representation of the human.

In Example 56, the non-transitory computer readable medium of Example 54 or 55, wherein the instructions are further configured to cause the one or more processors to determine a likelihood that the source of the vibration is the human of the identified representation of the human, and if the likelihood that the source of the vibration is the human is outside of a predetermined range, modifying a parameter of the artificial neural network.

In Example 57, the non-transitory computer readable medium of Example 56, wherein determining the likelihood that the source of the vibration is the human includes determining from the additional sensor data when the human changes location, and determining the likelihood proportionally to a temporal relationship between the human changing location and generation of any of the first electrical signal, the second electrical signal, or the third electrical signal.

In Example 58, the non-transitory computer readable medium of Example 56 or 57, wherein the determining the likelihood that the source of the vibration is the human includes determining from the additional sensor data whether the human changes location, if no human change of location is detected, modifying a parameter of the artificial neural network to disregard a detected vibration.

In Example 59, the non-transitory computer readable medium of any one of Examples 52 to 58, wherein the instructions are further configured to cause the one or more processors to determine an intersection of a first circle, having an origin at the first location and having a first radius; a second circle, having an origin at the second location, and having a second radius; and a third circle, having an origin at the third location, and having a third radius; wherein the second radius is determined as the first radius plus a value representing a time difference between generation of the first electrical signal and the second electrical signal; wherein the third radius is determined as the first radius plus a value representing a time difference between generation of the first electrical signal and the third electrical signal; and determining the position of the source of the vibration based on a location of the determined intersection.

In Example 60, the non-transitory computer readable medium of any one of Examples 52 to 59, further including a first zone and a second zone; wherein the instructions are further configured to cause the one or more processors to operate according to a first operational mode if the first position is within the first zone, and to operate according to a second operational mode if the first position is within the second zone.

In Example 61, the non-transitory computer readable medium of Example 60, wherein operating according to the first operational mode includes sending an alert instruction, and wherein operating according to the second operational mode includes not sending the alert instruction.

In Example 62, the non-transitory computer readable medium of Example 61, wherein the alert instruction is an instruction to implement a safety procedure, disable a machine, stop a process, sound an alarm, or any of these.

In Example 63, the non-transitory computer readable medium of any one of Examples 52 to 62, wherein the instructions are further configured to cause the one or more processors to determine the first position of the source of the vibration if a magnitude of at least one of the first electrical signal, the second electrical signal, or the third electrical signal is within a predetermined range, and not determine the first position of the source of the vibration if the magnitude of each of the first electrical signal, the second electrical signal, and the third electrical is outside of the predetermined range.

In Example 64, the non-transitory computer readable medium of any one of Examples 52 to 63, wherein the first location, the second location, and the third location are each at corners of a rectangular formation, at corners of a square formation, at corners of a triangular formation, or at corners of an irregular polygon formation.

While the above descriptions and connected figures may depict components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all Examples included herein.

What is claimed is:
1. A localization system, comprising:
 a first sensor, configured to detect a vibration and generate a first electrical signal in response to the detection of the vibration;

a second sensor, configured to detect the vibration and generate a second electrical signal in response to the detection of the vibration;

a third sensor, configured to detect the vibration and generate a third electrical signal in response to the detection of the vibration;

a fourth sensor, different from each of the first sensor, the second sensor, and the third sensor, and configured to generate fourth sensor data representing a source of the vibration; and a processor, configured to determine a first position of the source of the vibration based on the first electrical signal, the second electrical signal, and the third electrical signal;

wherein the processor is further configured to determine a second position of the source of the vibration based on the fourth sensor data and to identify a representation of a human in the fourth sensor data; and wherein the processor is further configured to determine a likelihood that a source of the vibration is a human identified in the representation of the human, and if a magnitude of the likelihood that the source of the vibration is the human is outside of a predetermined range, modify a parameter of an artificial neural network.

2. The localization system of claim 1, wherein the artificial neural network comprises: an input layer, at least one middle layer, and an output layer;

wherein the artificial neural network is configured to:
receive the first electrical signal, the second electrical signal, and the third electrical signal at the input layer;
process the first electrical signal, the second electrical signal, and the third electrical signal through one or more hidden layers; and
generate from the output layer an output representing the first position;
wherein the processor determining the first position comprises the processor executing the neural network to determine the first position.

3. The localization system of claim 2, further comprising a memory, on which are stored first location data, representing a location of the first sensor; second location data, representing a location of the second sensor; and third location data, representing a location of the third sensor;

wherein the artificial neural network is further configured to determine the first position of the source of the vibration based on the first location data, the second location data, and the third location data.

4. The localization system of claim 1, wherein the first sensor, the second sensor, and the third sensor are each inertial measurement unit sensors.

5. The localization system of claim 1, wherein the processor determining the first position of the source of the vibration based on the first electrical signal, the second electrical signal, and the third electrical signal comprises the processor:

determining a first time difference between generation of the first electrical signal and the second electrical signal;
determining a second time difference between generation of the third electrical signal and either the first electrical signal or the second electrical signal; and
determining the first position of the source of the vibration based in the first time difference and the second time difference.

6. The localization system of claim 1, wherein the processor determining the likelihood that the source of the vibration is the human identified in the representation of the human comprises the processor determining from the fourth sensor data when the human changes location, and determining the likelihood proportionally to a temporal relationship between the human changing location and generation of any of the first electrical signal, the second electrical signal, or the third electrical signal.

7. The localization system of claim 6, wherein the processor determining the likelihood that the source of the vibration is the human identified in the representation of the human comprises the processor determining from the fourth sensor data whether the human changes location, if no human change of location is detected, modifying a parameter of the artificial neural network to disregard a detected vibration.

8. The localization system of claim 7, wherein the fourth sensor is any of a light detection and ranging (lidar) sensor; a radio detection and ranging (radar), an image sensor, or a depth camera.

9. The localization system of claim 1, wherein the processor is further configured to determine an intersection of a first circle, having an origin at the first sensor and having a first radius; a second circle, having an origin at the second sensor, and having a second radius; and a third circle, having an origin at the third sensor, and having a third radius;

wherein the second radius is determined as the first radius plus a value representing a time difference between generation of the first electrical signal and the second electrical signal;
wherein the third radius is determined as the first radius plus a value representing a time difference between generation of the first electrical signal and the third electrical signal; and wherein the processor is configured to determine the first position of the source of the vibration based on a location of the determined intersection.

10. The localization system of claim 1, further comprising a first zone and a second zone; wherein, the processor is configured to operate according to a first operational mode if the first position is within the first zone, and the processor is configured to operate according to a second operational mode if the first position is within the second zone.

11. The localization system of claim 10, wherein the processor operating according to the first operational mode comprises the processor sending an alert instruction, and wherein the processor operating according to the second operational mode comprises the processor not sending the alert instruction.

12. The localization system of claim 11, wherein the alert instruction is an instruction to implement a safety procedure, disable a machine, stop a process, sound an alarm, or any of these.

13. The localization system of claim 1, wherein the processor is configured to determine the first position of the source of the vibration if a magnitude of at least one of the first electrical signal, the second electrical signal, or the third electrical signal is within a predetermined range, and wherein the processor is configured not to determine the first position of the source of the vibration if the magnitude of each of the first electrical signal, the second electrical signal, and the third electrical signal is outside of the predetermined range.

14. The localization system of claim 1, further comprising one or more fourth sensors, configured to detect a vibration and generate one or more fourth electrical signals in response to the detection of the vibration; and
   wherein the processor is further configured to determine the first position of a source of the vibration based on the first electrical signal, the second electrical signal, the third electrical signal, and the one or more fourth electrical signals.

15. A non-transitory computer readable medium, comprising instructions which, if executed, cause one or more processor to:
   detect a vibration at a first location and generating a first electrical signal in response to the detection of the vibration;
   detect the vibration at a second location and generating a second electrical signal in response to the detection of the vibration;
   detect the vibration at a third location and generating a third electrical signal in response to the detection of the vibration; and
   determine a first position of a source of the vibration based on the first electrical signal, the second electrical signal, and the third electrical signal,
   wherein the instructions are further configured to cause the one or more processors to:
      determine a second position of the source of the vibration using additional sensor data to identify a representation of a human in the additional sensor data; and
      adjust a parameter used to determine the first position based on a difference between the first position and the second position.

16. The non-transitory computer readable medium of claim 15, wherein determining the first position of the source of the vibration based on the first electrical signal, the second electrical signal, and the third electrical signal comprises:
   determining a first time difference between generation of the first electrical signal and the second electrical signal;
   determining a second time difference between generation of the third electrical signal and either the first electrical signal or the second electrical signal; and
   determining the first position of the source of the vibration based in the first time difference and the second time difference.

17. A localizer, comprising:
   a first sensing means, for detecting a vibration and generating a first electrical signal in response to the detection of the vibration;
   a second sensing means, for detecting the vibration and generating a second electrical signal in response to the detection of the vibration;
   a third sensing means, for detecting the vibration and generating a third electrical signal in response to the detection of the vibration; and
   a processing means, for determining a first position of a source of the vibration based on the first electrical signal, the second electrical signal, and the third electrical signal,
   wherein the processing means is further configured to:
      determine a second position of the source of the vibration using additional sensor data to identify a representation of a human in the additional sensor data; and
      adjust a parameter used to determine the first position based on a difference between the first position and the second position.

18. The localizer of claim 17, further comprising an artificial neural network comprising: an input layer, at least one middle layer, and an output layer;
   wherein the artificial neural network is configured to:
      receive the first electrical signal, the second electrical signal, and the third electrical signal at the input layer;
      process the first electrical signal, the second electrical signal, and the third electrical signal through one or more hidden layers; and
      generate from the output layer an output representing the first position;
   wherein the processing means determining the first position comprises the processing means executing the neural network to determine the first position.

19. The localizer of claim 18, further comprising a memory, on which are stored first location data, representing a location of the first sensing means; second location data, representing a location of the second sensing means; and third location data, representing a location of the third sensing means;
   wherein the artificial neural network is further configured to determine the first position of the source of the vibration based on the first location data, the second location data, and the third location data.

20. The localizer of claim 17, wherein the first sensing means, the second sensing means, and the third sensing means are each inertial measurement unit sensors.

21. The localizer of claim 17, wherein the processing means determining the first position of the source of the vibration based on the first electrical signal, the second electrical signal, and the third electrical signal comprises the processing means:
   determining a first time difference between generation of the first electrical signal and the second electrical signal;
   determining a second time difference between generation of the third electrical signal and either the first electrical signal or the second electrical signal; and
   determining the first position of the source of the vibration based in the first time difference and the second time difference.

* * * * *